(12) United States Patent
Andersson et al.

(10) Patent No.: US 8,162,249 B2
(45) Date of Patent: Apr. 24, 2012

(54) CHIPPER KNIFE AND METHOD OF MANUFACTURING A CHIPPER KNIFE

(75) Inventors: Torbjörn Andersson, Forsa (SE); Torbjörn Bäcklund, Hudiksvall (SE)

(73) Assignee: Iggesund Tools AB, Iggesund (SE)

( * ) Notice: Subject to any disclaimer, the term of this patent is extended or adjusted under 35 U.S.C. 154(b) by 0 days.

(21) Appl. No.: 12/522,784

(22) PCT Filed: Jan. 8, 2008

(86) PCT No.: PCT/SE2008/000011
§ 371 (c)(1),
(2), (4) Date: Feb. 1, 2010

(87) PCT Pub. No.: WO2008/085112
PCT Pub. Date: Jul. 17, 2008

(65) Prior Publication Data
US 2010/0163662 A1  Jul. 1, 2010

(30) Foreign Application Priority Data
Jan. 12, 2007 (SE) ........................ 0700047

(51) Int. Cl.
*B02C 18/18* (2006.01)
(52) U.S. Cl. ........................ 241/294; 241/92

(58) Field of Classification Search ............... 241/294, 241/296, 298, 278.1, 92; 144/241, 220, 230
See application file for complete search history.

(56) References Cited

U.S. PATENT DOCUMENTS

| | | | | |
|---|---|---|---|---|
| 3,321,145 A * | 5/1967 | Gorman | ...................... | 241/189.1 |
| 5,564,967 A | 10/1996 | Jorgensen | | |
| 6,523,768 B2 * | 2/2003 | Recker et al. | ................ | 241/294 |

FOREIGN PATENT DOCUMENTS
EP  1329295  7/2003
* cited by examiner

*Primary Examiner* — Faye Francis
(74) *Attorney, Agent, or Firm* — Fitzpatrick, Cella, Harper & Scinto

(57) ABSTRACT

A chipper knife that is adapted to be mounted in chippers which have a rotatable tool, in the form of a disc, drum or frustoconical member, on which a plurality of such chipper knives are mounted has at least a first side having a raw, unworked surface or working stripes extending in the longitudinal direction of the chipper knife, substantially parallel to the cutting edge which also has a cutting edge portion extending inwardly from the cutting edge and terminating in a shoulder extending parallel to the cutting edge to provide a clearance step on the knife behind the shoulder with respect to the adjacent knife surface, which edge portion also has working stripes formed therein transverse that cutting edge portion and at an angle to the cutting edge.

11 Claims, 3 Drawing Sheets

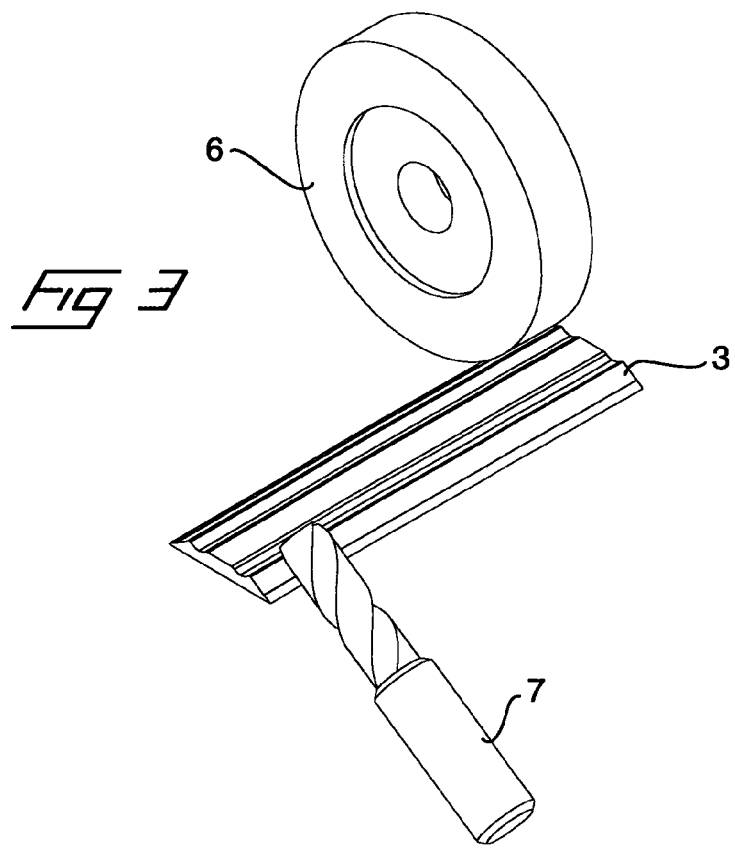
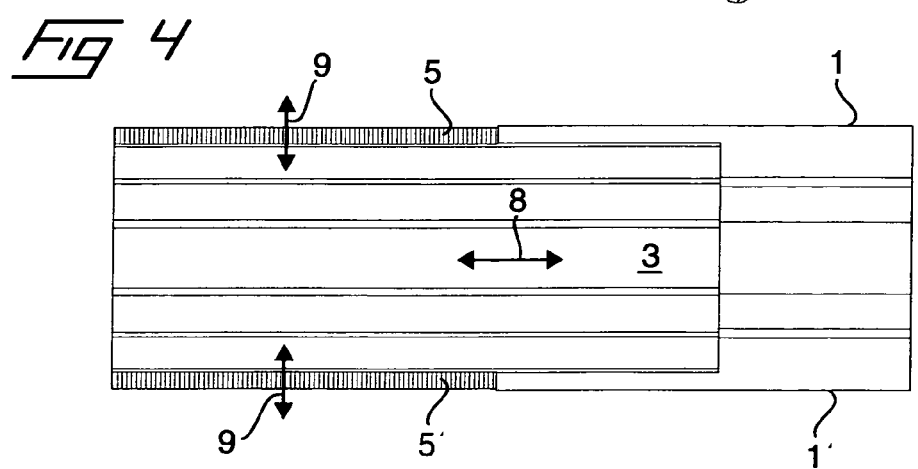
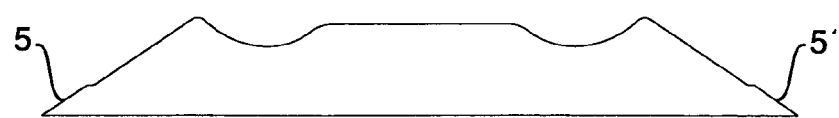

CHIPPER KNIFE AND METHOD OF MANUFACTURING A CHIPPER KNIFE

The present invention relates to a chipper knife of the type that is adapted to be mounted in chippers which have a rotatable tool, in the form of a disc, drum or frustoconical member, on which are mounted a plurality of such chipper knives to provide, during rotation of the tool and simultaneous feeding of pieces of wood or timber to the same, material cutting working or disintegrating of the pieces of wood into chips, comprising at least one cutting edge which is defined between two edge forming surfaces at an acute angle to each other, at least a first side of the chipper knife having a raw, unworked surface or working stripes in the longitudinal direction of the chipper knife, that is substantially parallel to the cutting edge.

The invention also concerns a method of manufacturing such a chipper knife.

BACKGROUND ART

Chipper knives of the above type are in operation subjected to very great forces. Since it is advantageous for economical reasons if each chipper knife can be operated as long as possible between each replacement or regrinding and the next, it is desirable for each chipper knife to have a maximum service life. At the same time it is, also for economical reasons, above all in the case of replacement knives that are replaced and not reground after wear, desirable for each chipper knife to contain a minimum of material, that is to be manufactured at as low a cost as possible. Thus, it is as a rule not an alternative to make the knives heavily dimensioned and reinforced in order to obtain a long service life.

While striving to achieve the optimal total economy of a knife system for chippers, it is also important to find a method of manufacture which provides rational manufacture and high quality.

As a rule, it is desirable to make blanks for the chipper knives with maximum dimensional accuracy so that only a minimum of reworking will be necessary. This results in a reduction of the consumption of materials, the time required for reworking and the costs of machinery and tools for reworking. The blanks can be made by a suitable method, such as rolling, cold drawing, powder metallurgy, forging or casting. It is optimal if the blanks can be made which such high dimensional accuracy that reworking can be limited to slight sharpening of the cutting edges, or alternatively that, in addition, only certain limited portions of the chipper knives, such as abutment surfaces for fastening the chipper knives in the chippers, are subjected to reworking. In sharpening of the chipper knives, it is advantageous if this can be limited to merely a narrow edge portion next to the cutting edge, but it may be difficult to define such a narrow working area so as to achieve a particularly aesthetically good result.

In many cases, it is however still desirable to rework substantially all surfaces of a chipper knife for sufficient dimensional accuracy. When manufacturing chipper knives in which one or both of the major surfaces have a profiled shape in cross-section, that is have grooves or ridges in the longitudinal direction of the chipper knife, it has been found that a very rational method of reworking all surfaces of a chipper knife involves, for instance, deep-feed grinding or pendulum grinding of substantially the entire width of the major surface in the longitudinal direction of the chipper knife. In such a method of manufacture, first a blank is made, by means of a suitable method, for instance metallurgy, cold drawing, powder metallurgy, forging or casting, the blank having basically the desired shape but with a slight oversize. By subsequent grinding, which is carried out by means of a rotating grinding wheel having the desirable cross-sectional profile, and moving the chipper knife and the grinding wheel, during simultaneous rotation of the grinding wheel, relative to each other along the entire longitudinal extent of the chipper knife, the final shape with correct dimensions is achieved. However, such grinding suffers from the drawback that the chipper knit obtains randomly located working stripes in the longitudinal direction of the chipper knife which per se are shallow but nevertheless are important to the service life and operation characteristics of the chipper knife. Such working stripes will extend parallel to the cutting edge, that is perpendicular to the chipping direction, and thus form small indications of fracture which may result in the chipper knife having a slightly lower resistance to the chipping forces acting on it. The working stripes also increase the chipper knife's friction on the wood surfaces and thus add to the increased consumption of energy and can influence the average size of the chips.

BRIEF DESCRIPTION OF THE INVENTION

The present invention aims at eliminating problems and drawbacks of chipper knives of the type mentioned by way of introduction. More specifically, the invention relates to a chipper knife which is made by a rational method of manufacture. At least this object is achieved by a chipper knife construction in accordance with the disclosure of this specification.

The invention also relates to method of manufacturing such a chipper knife, which has substantially the same object as stated above. This object is achieved by a method of manufacturing as described in this specification.

The invention is thus based on the knowledge that the above object can be achieved by providing the chipper knife with a thickened cutting edge portion next to the cutting edge on at least one of its sides. As a result, the required reworking of the cutting edge of a chipper knife which otherwise has raw, unworked surfaces, can be reduced to a minimum. In the case where the chipper knife, on the one hand, is made by reworking of substantially all its surfaces and has working stripes parallel to its cutting edge, the cutting edge can in a similar manner be reworked so as to obtain working stripes at an angle to the cutting edge, in which case this reworking can also be limited to a very narrow area next to the cutting edge.

The invention thus makes it possible to either manufacture the chipper knife by minimal working of merely the cutting edge portion whereas the other surfaces are left wholly or partly unworked and thus have a slightly raw surface with a more or less coarse structure that is formed when making the blank. The possibilities of such a method increase with the development of methods of making blanks with increased dimensional accuracy of the blanks. Alternatively, the chipper knife can be made by reworking in the form of a grinding process in the longitudinal extent of the chipper knife parallel to the cutting edge. This results in a chipper knife with working stripes parallel to the cutting edge on at least one side of the chipper knife. This process results in an advantage in terms of manufacture since substantially the entire side of the chipper knife can be finished in a single step even if the chipper knife is made with a profiled shape. However, there arises the drawback that the chipper knife will have small but significant working stripes parallel to the cutting edge. These working stripes function as small indications of fracture, which reduce the tensile strength to bending forces at an angle to the cutting edge, increase the risk of fatigue failure and cause increased friction in chipping which results in increased strain in both the chipper knife and the rest of the chipper, lower quality of the chips and increased consumption of power. According to the invention, this drawback can however be eliminated by the chipper knife being provided with a thickened cutting edge portion in the area next to the cutting edge. In a subsequent working step, the thickened cutting edge portion is worked so that the surface instead obtains small working stripes at an angle of at least 45°, preferably 70° and most preferred substantially perpendicular to the cutting edge.

By providing the cutting edge with such a thickened cutting edge portion which is reworked so that the working stripes are directed at an angle to the cutting edge, a number of advantages are obtained. It has been mentioned above that this results in removal of any working stripes parallel to the cutting edge in the area next to the same, which can function as indications of fracture and promote fracture adjacent to and parallel to the cutting edge. Also reduced friction in chipping has been mentioned. Depending on whether the thickened cutting edge portion is positioned on the wood side of the chipper knife, that is the side oriented toward the arriving pieces of wood, or the chip side, that is the side oriented toward the side where the chips are formed, disintegrated and further transported, different advantages are obtained. If the thickened cutting edge portion is positioned on the wood side, this will add to the condition that the chipper knife will have a reduced interfering influence on the feeding of pieces of wood to the chipper. Since the thickened cutting edge portion is intended to be made relatively narrow, in a preferred embodiment 3-7 mm, preferably 4-6 mm, the rear edge of the thickened cutting edge portion will in fact serve as an extra clearance which results in the piece of wood not abutting against and breaking by friction on the chipper knife during chipping. Similarly, if the thickened cutting edge portion is arranged on the chip side of the chipper knife, an increased clearance is obtained at the rear edge of the thickened cutting edge portion, which may result on the one hand in reduced upsetting of the chips, that is reduced breaking of the wood fibres, and on the other hand in the chips being split into thinner chips since the friction exerted by the chipper knife that acts on an individual chip and helps to compress the chip will be lower. Thinner chips with the length maintained is generally preferred, in particular for chips that are to be used for production of paper pulp.

Within the scope of the general inventive concept, the invention can be modified in various ways. For instance, one or both sides of a cutting edge can be provided with thickened cutting edge portions. The edge portions may further have different widths and/or different heights. In a preferred embodiment, the edge portion of the finished chipper knife has a width of 37 mm, preferably 4-6 mm, and the preferred height or thickness is 0.05-0.5 mm or about 0.1 mm, but also other dimensions are conceivable within the scope of the invention.

The working of the cutting edge portions of the chipper knife as well as the working of the other surfaces of the same can be carried out in different ways. For instance, the working of the thickened cutting edge portion can take place by grinding by means of a grinding or polishing disc, by means of a grinding belt or milling by means of a milling tool. When using a grinding or polishing disc, the grinding operation can be carried out using the circumferential surface of the disc or a radial surface. In the former case, the cutting edge portion will be somewhat concave, while in the latter case the working stripes will be slightly arcuate. As mentioned above, it is advantageous, in chipper knives having a profiled shape in cross-section, to perform finishing of the blanks by deep-feed grinding or pendulum grinding, bur also other techniques of working can be used, such as milling in different steps. The thickened cutting edge portions can optionally be formed in the blanks or be formed in connection with grinding.

In general, working by milling is usually preferred, since this can take place in a dry state while grinding in most cases requires some kind of grinding liquid, such as water, for cooling, which requires additional devices for supply and collection of the grinding liquid and cleaning of the same. In the finishing operation, the grinding disc or the milling cutter can optionally move relative to a stationary chipper knife or the chipper knife can move relative to a stationary, but rotating, grinding disc or a milling tool.

Finishing of the thickened cutting edge portion is not necessary although preferred, so that the working stripes will be oriented strictly perpendicular to the cutting edge. The advantages of the invention are achieved also if the working stripes are slightly inclined relative to the cutting edge. In a preferred embodiment, the angle should be at least 45° to the cutting edge, preferably at least 70°.

The invention can also be applied to chipper knives that do not chip pieces of the wood, but are used, for instance, in a "reducer" for smoothing the wood surfaces of a wood block, which by means of the reducer is cut from a round block by chipping of the excess material. Within the scope of the invention, also chipper knives are included that are used to chip thin chips for use in production of fibreboards of different types, such as Waferboards or OSB boards. Machines for such production of chips usually have a rotating drum where the knives are mounted along the inner circumference of the drum and the pieces of wood are supplied to the drum for chipping.

BRIEF DESCRIPTION OF THE DRAWINGS

Preferred embodiments of the invention will in the following be described with reference to the accompanying drawings, in which

FIG. 3 is a perspective view of the chipper knife in FIG. 2;

FIG. 4 is a top plan view of the chipper knife in FIGS. 1-3, which illustrates different portions of the chipper knife before and after the different steps of working;

FIG. 5 is a cross-section of the chipper knife in FIGS. 1-4 in the finished state;

DETAILED DESCRIPTION OF PREFERRED EMBODIMENTS OF THE INVENTION

FIGS. 1-6 illustrate a chipper knife which has two cutting edges 1, 1'. The chipper knife has a completely flat underside 2 while an upper side 3, which is adapted to be oriented toward a wood side, has a profiled shape in cross-section. The respective cutting edges 1, 1' are formed between the underside 2 and a bevelled surface on the upper side.

Figure 1:
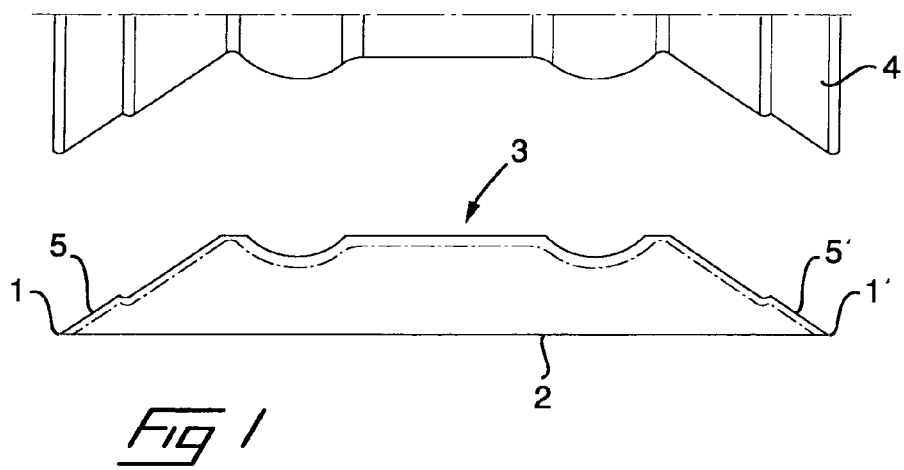
FIG. 1 is a cross-section of a blank for a chipper knife that is worked by means of a profiled grinding wheel for deep-feed grinding of one side of the chipper knife.

FIG. 1 illustrates a blank for the chipper knife, which can be made, for example, by rolling, and which has a certain oversize relative to the shape of the completed chipper knife as indicated by a dash-dotted line. The final shape of the upper side is obtained, in the shown embodiment, by deep feed grinding by means of a rotating grinding wheel 4 which rotates in a plane parallel to the longitudinal extent of the clipper knife and which has a profiled shape that conforms with the desired shape of the upper side of the chipper knife. In grinding, the chipper knife will obtain shallow but characteristic working stripes in its longitudinal extent. The grinding wheel 4 aid the chipper knife are moved during grinding relative to each other in the longitudinal extent of the chipper knife. In the shown embodiment, the entire upper side of the chipper knife is subjected to deep-feed grinding. Also the areas next to each cutting edge that are to form thickened cutting edge portions 5, 5'. The finishing of the underside 2, which is here not shown in detail, suitably occurs so that working stripes in the longitudinal extent of the chipper knife are avoided.

Figure 2:
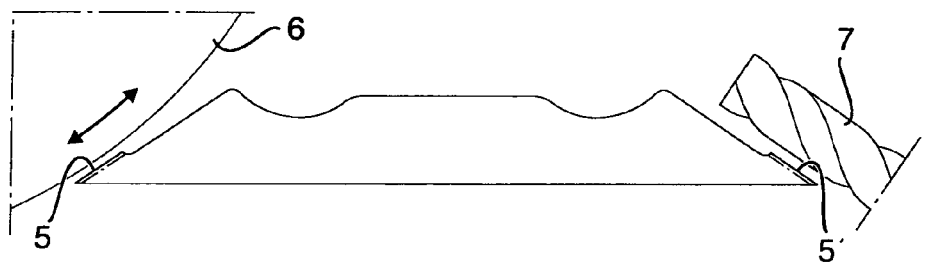
FIG. 2 is a cross-section of the deep-feed ground chipper knife according to FIG. 1, which is shown during finishing of the thickened cutting edge portion by milling and by grinding.

Subsequently, reference is made to FIGS. 2 and 3 which illustrate two alternative ways of finishing the thickened cutting edge portions 5, 5'. To the left it is shown how working can be done using a grinding disc 6, which can rotate in any direction, and to the right it is show) how working can take place by means of a rotary milling tool 7. During working, the chipper knife and the grinding disc 6 or the milling tool 7 are moved relative to each other in the longitudinal direction of the chipper knife. Both ways of working resift in small but characteristic working stripes transversely to the cutting edges of the chipper knife, which is advantageous by preventing the occurrence of indications of fracture parallel to the cutting edge and reducing friction, as described above. Of these two methods of working, working by milling is preferred, as mentioned above, since such working can be made in a dry state, whereas grinding as a rule requires some kind of grinding liquid. Working by means of the circumferential surface of a grinding disc 6, as shown in the figures, results in a cutting edge surface which is slightly concave, which however in most cases is not disadvantageous. It should be noted that in working using a grinding disc 6, working stripes are formed which are directed tangentially to the grinding disc, and therefore the plane of rotation thereof is oriented transversely to the chipper knife. In working using a milling tool, on the other hand, working stripes are formed that are directed axially to the milling tool, and therefore the plane of rotation thereof is oriented parallel to the longitudinal extent of the chipper knife. As a rule, it is not desirable to remove the entire thickened cutting edge portion, but preferably a thickened cutting edge portion 5, 5' with a height of about 0.1 mm can be left on the finished chipper knife as illustrated in FIG. 5. Such a remaining thickened cutting edge portion results in, as mentioned above, an increased clearance relative to the pieces of wood to be chipped, and reduced friction and is also advantageous from an aesthetic point of view since the boundary line between areas with parallel working stripes or unworked areas and areas with transverse working stripes relative to the cutting edges, will be straight and distinct.

FIG. 4 illustrates different areas of the chipper knife before and after the different steps of working, in a top plan view of the chipper knife. At the extreme right, the blank for the chipper knife is shown, as supplied from rolling. Somewhat further to the left, the upper side 3 of the chipper knife after deep-feed grinding is illustrated, in which the chipper knife obtains working stripes in the direction of the arrow 8, that is in the longitudinal direction of the chipper knife parallel to the cutting edges 1, 1'. At the extreme left, the chipper knife is shown after finishing of its thickened cutting edge portions 5, 5', in which the cutting edge surfaces obtain working stripes in the direction of the arrow 9, that is transversely to the longitudinal direction of the chipper knife and the cutting edges 1, 1'. The final cross-sectional shape of the chipper knife is illustrated in FIG. 5.

Figure 6:
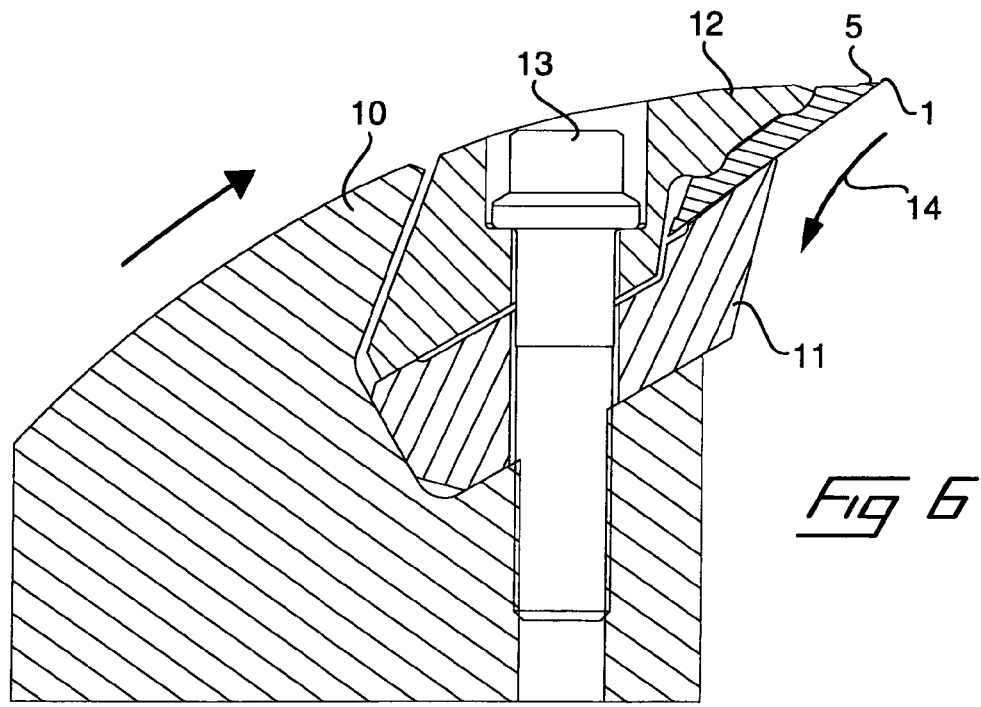
FIG. 6 is a cross-section of a portion of a chipper in which a chipper knife according to FIG. 5 is mounted.

FIG. 6 illustrates the arrangement of a chipper knife according to FIGS. 1-5 in a chipper of a drum chipper type, of which a portion is shown in cross-section. The chipper knife is arranged in the chipper in such a manner that one of its cutting edges 1 will be positioned outside the outer circumference of the drum 10. The chipper knife is fastened in a recess in the drum 10 by means of an inner clamping element 11 and an outer clamping element 12, which are pressed toward one another by means of a bolt 13 and clamp the chipper knife between them. As is evident, the thickened cutting edge portion 5 is oriented toward a wood side, that is the side from where the pieces of wood to be chipped arrive. The flat underside 2 of the chipper knife is oriented inward toward a chip side, that is the side where the chips are separated and passed through the drum via a chip passage 14.

Figure 7:
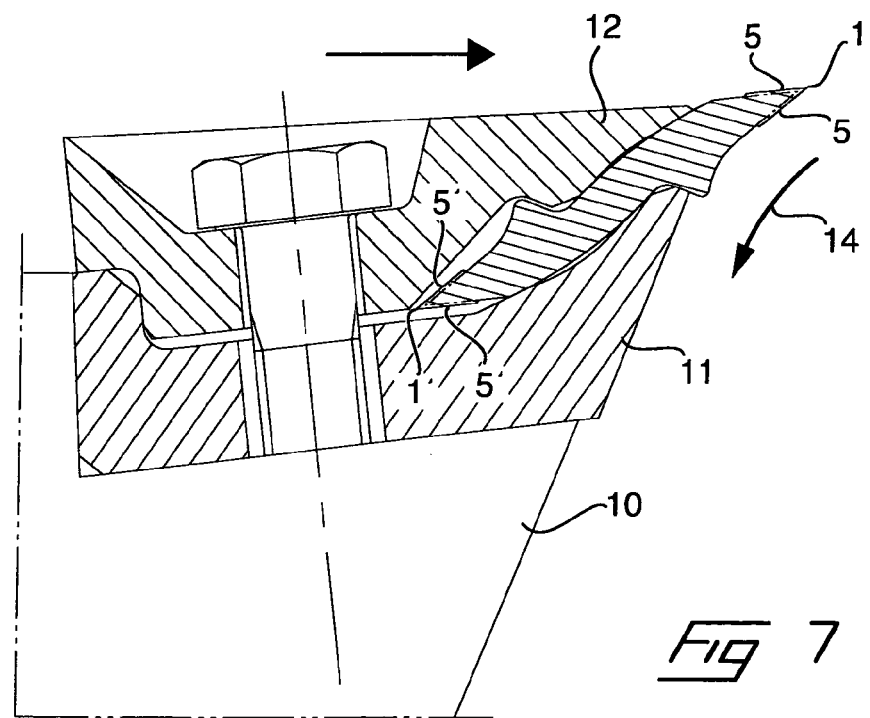
FIG. 7 is a cross-section of a portion of a different type of chipper, in which a chipper knife according to an alternative embodiment is mounted.

FIG. 7 shows an alternative chipper knife, both sides of which are identical, that is both sides are profiled in cross-section and made by deep-feed grinding. As a result, both sides will also have working stripes in the longitudinal extent of the chipper knife, and therefore both sides of each cutting edge are provided with thickened cutting edge portions 5, 5', that is in mounting of the chipper knife in the chipper, both the wood side and the chip side of the cutting edge will be provided with a thickened cutting edge portion. The shown chipper is of a disc chipper type, of which part of a rotary disc 15 is shown in the figure. Like in the chipper shown in FIG. 6, this chipper has an inner clamping element 11 and an outer clamping element 12, between which the chipper knife is fastened, and a chip passage 14 through which the cut chips can be passed through the disc.

The invention claimed is:

1. A wood chipper knife comprising:
   a knife body having longitudinal and transverse dimensions and first and second opposed side surfaces each of which includes cutting edge surface portions which intersect at an acute angle to form at least one longitudinally extending cutting edge, wherein:
   the cutting edge surface portion on the first side surface of the knife is formed as a raised edge portion at an area closest to said at least one cutting edge, extends inwardly from the cutting edge, terminates at a shoulder extending parallel to and facing away from the cutting edge, defines a clearance step surface on the knife behind the shoulder with respect to the adjacent portion of the first side surface;
   said raised edge portion being machined to have working stripes therein which are generally transverse to the longitudinal dimension of the knife body and at an angle to the cutting edge; and
   at least a portion of said first side surface of the knife body, inwardly of the clearance step, having a raw, unworked surface, or working stripes machined therein in the longitudinal direction of the knife body substantially parallel to the cutting edge.

2. A wood chipper knife as claimed in claim 1, wherein the first side surface of the knife is on the side of the knife which is oriented toward pieces of wood to be chipped when in use and defines the wood side of the knife.

3. A wood chipper knife as claimed in claim 1, wherein the first side surface of the knife is on the side of the knife which is oriented away from pieces of wood to be chipped when in use and defines the chipper side of the knife.

4. A wood chipper knife as claimed in claim 1, wherein the cutting edge portion on the second side surface of the knife is formed as a raised edge portion at an area closest to said at least one cutting edge and extends inwardly from the cutting edge and terminates at a shoulder extending parallel to and facing away from the cutting edge to provide a clearance step on the second side surface of the knife behind the shoulder with respect to the adjacent portion of the second side surface and said cutting edge surface portion on the second side surface of the knife having working stripes formed therein which are transverse to that cutting edge surface portion at an angle to the cutting edge and, wherein at least a portion of said second surface of the knife body, inwardly of the clearance step has a raw, unworked surface, or working stripes machined therein in the longitudinal direction of the knife body substantially parallel to the cutting edge.

5. A wood chipper knife as claimed in claim 1, 2, 3 or 4 wherein the cutting edge portion which terminates in a shoulder is 3-7 mm wide, preferably 4-6 mm wide.

6. A chipper knife as claimed in claim 5 wherein the cutting edge portion which terminates in a shoulder is 0.05-0.5 mm thick.

7. A wood chipper knife as claimed in claim 5 wherein the angle between the working stripes in the cutting edge portion which terminates in a shoulder and the cutting edge is at least 45°.

8. A wood chipper knife as claimed in claim 7 wherein the angle between the working stripes in the cutting edge portion which terminates in a shoulder and the cutting edge is at least 70°.

9. A wood chipper knife as claimed in claim 1, 2, 3 or 4 wherein the cutting edge portion which terminates in a shoulder is 0.05-0.5 mm thick.

10. A wood chipper knife as claimed in claim 1, 2, 3 or 4 wherein the angle between the working stripes in the cutting edge portion which terminates in a shoulder and the cutting edge is at least 45°.

11. A wood chipper knife as claimed in claim 1, 2, 3 or 4 wherein the angle between the working stripes in the cutting edge portion which terminates in a shoulder and the cutting edge is at least 70°.

* * * * *